US006799099B2

(12) United States Patent
Zeitler et al.

(10) Patent No.: US 6,799,099 B2
(45) Date of Patent: Sep. 28, 2004

(54) MATERIAL HANDLING SYSTEMS WITH HIGH FREQUENCY RADIO LOCATION DEVICES

(75) Inventors: David W. Zeitler, Caledonia, MI (US); Garry Koff, Grand Rapids, MI (US); Matt Werner, Ada, MI (US)

(73) Assignee: Rapistan Systems Advertising Corp., Grand Rapids, MI (US)

(*) Notice: Subject to any disclaimer, the term of this patent is extended or adjusted under 35 U.S.C. 154(b) by 0 days.

(21) Appl. No.: 10/209,766

(22) Filed: Jul. 31, 2002

(65) Prior Publication Data

US 2003/0028323 A1 Feb. 6, 2003

Related U.S. Application Data

(60) Provisional application No. 60/318,029, filed on Sep. 10, 2001, and provisional application No. 60/309,568, filed on Aug. 2, 2001.

(51) Int. Cl.[7] .............................................. G01C 22/00
(52) U.S. Cl. ...................... 701/23; 701/200; 701/201; 701/207; 340/998
(58) Field of Search ....................... 701/23, 200, 201, 701/207, 211; 340/998

(56) References Cited

U.S. PATENT DOCUMENTS

| | | | | |
|---|---|---|---|---|
| 3,757,290 A | | 9/1973 | Ross et al. | |
| 4,541,049 A | * | 9/1985 | Ahlbom ........................ | 701/23 |
| 4,956,777 A | * | 9/1990 | Cearley et al. ................ | 701/24 |
| 5,111,401 A | * | 5/1992 | Everett et al. ................. | 701/24 |
| 5,202,832 A | * | 4/1993 | Lisy ............................. | 701/24 |
| 5,283,739 A | * | 2/1994 | Summerville et al. ........ | 701/23 |
| 5,438,517 A | | 8/1995 | Sennott et al. | |
| 5,510,800 A | | 4/1996 | McEwan | |
| 5,687,169 A | | 11/1997 | Fullerton | |
| 5,764,696 A | | 6/1998 | Barnes et al. | |

(List continued on next page.)

FOREIGN PATENT DOCUMENTS

| | | |
|---|---|---|
| GB | 2274521 A | 7/1994 |
| WO | 8805938 | 8/1988 |
| WO | 0071442 A2 | 11/2000 |

OTHER PUBLICATIONS

"Aether Wire and Location, Inc." Sep. 13, 2000, supported by web site aetherwire.com.
"Experimental Results from an Ultra Wideband . . ." by Fontana, Robert J.
"Logistic Solutions Through Technology" Brochure.
"Logistik Heute" Magazine article and English Translation, Jun. 23, 2001.
"Pulsing with promise" by Maney, Kevin, USA Today.
"Ultrawideband: an electronic free lunch?", by Web, Warren, EDN, Dec. 21, 2000.

(List continued on next page.)

Primary Examiner—William A. Cuchlinski, Jr.
Assistant Examiner—Olga Hernandez
(74) Attorney, Agent, or Firm—Van Dyke, Gardner, Linn & Burkhart, LLP

(57) ABSTRACT

A material handling system uses high-frequency location devices for determining the location of mobile units, such as AGVs, overhead mono-rails, conveyor components, or individual articles being transported by such units. The high-frequency location devices may also be used to identify the contents and/or routing information for material being moved within a facility. AGVs may incorporate the high-frequency location devices into their navigation systems to utilize the position and/or heading updates provided by the location devices in guiding the vehicle. The location devices work in cooperation with a number of stationary location devices, such as beacons, that are positioned within the environment at known locations, such as in or adjacent the ceiling of the workplace environment. High-frequency radars may also be used to provide electronic bumpers to the AGVs, allowing them to sense obstacles and take appropriate action to avoid collisions with the obstacles.

38 Claims, 11 Drawing Sheets

U.S. PATENT DOCUMENTS

| | | | |
|---|---|---|---|
| 5,805,110 | A | 9/1998 | McEwan |
| 5,812,081 | A | 9/1998 | Fullerton |
| 5,832,035 | A | 11/1998 | Fullerton |
| 5,901,172 | A | 5/1999 | Fontana et al. |
| 5,907,293 | A | 5/1999 | Tognazzini |
| 5,907,427 | A | 5/1999 | Scalora et al. |
| 5,952,956 | A | 9/1999 | Fullerton |
| 5,960,031 | A | 9/1999 | Fullerton et al. |
| 5,963,581 | A | 10/1999 | Fullerton et al. |
| 5,969,663 | A | 10/1999 | Fullerton et al. |
| 5,995,534 | A | 11/1999 | Fullerton et al. |
| 6,002,708 | A | 12/1999 | Fleming et al. |
| 6,026,125 | A | 2/2000 | Larrick, Jr. et al. |
| 6,031,862 | A | 2/2000 | Fullerton et al. |
| 6,054,950 | A | 4/2000 | Fontana |
| 6,091,374 | A | 7/2000 | Barnes |
| 6,111,536 | A | 8/2000 | Richards et al. |
| 6,133,876 | A | 10/2000 | Fullerton et al. |
| 6,173,904 | B1 | 1/2001 | Doherty et al. |
| 6,177,903 | B1 | 1/2001 | Fullerton et al. |
| 6,218,979 | B1 | 4/2001 | Barnes et al. |
| 6,239,741 | B1 | 5/2001 | Fontana et al. |
| 6,295,019 | B1 | 9/2001 | Richards et al. |
| 6,297,773 | B1 | 10/2001 | Fullerton et al. |
| 6,300,903 | B1 | 10/2001 | Richards et al. |
| 6,304,623 | B1 | 10/2001 | Richards et al. |
| 6,445,336 | B2 * | 9/2002 | Soshi et al. .................. 342/70 |
| 6,473,686 | B2 * | 10/2002 | Adachi et al. ................ 701/96 |
| 6,526,352 | B1 * | 2/2003 | Breed et al. ................. 701/213 |
| 6,532,416 | B1 | 3/2003 | Mueller |

OTHER PUBLICATIONS

"Ultrawideband for PicoRadio Networks" by Feming and Kushner, Jun. 26, 2000.

"Ultrawideband Localizers, Executive Summary" by Aether Wire and Location, 1999.

International Search Report from corresponding International Application No. PCT/EP02/08668.

Aono T. et al., "Positioning of vehicle on undulating ground using GPS and dead reckoning," Proceedings of the 1998 IEEE International Conference on Robotics & Automation, Leuven, Belgium, May 1998, pp. 3443–3448.

McKay, K. M. , "Integrated Automatic Vehicle Location Systems," Position Location and Navigation Symposium, 1996, IEEE 1996, Atlanta, GA, pp. 230–234.

* cited by examiner

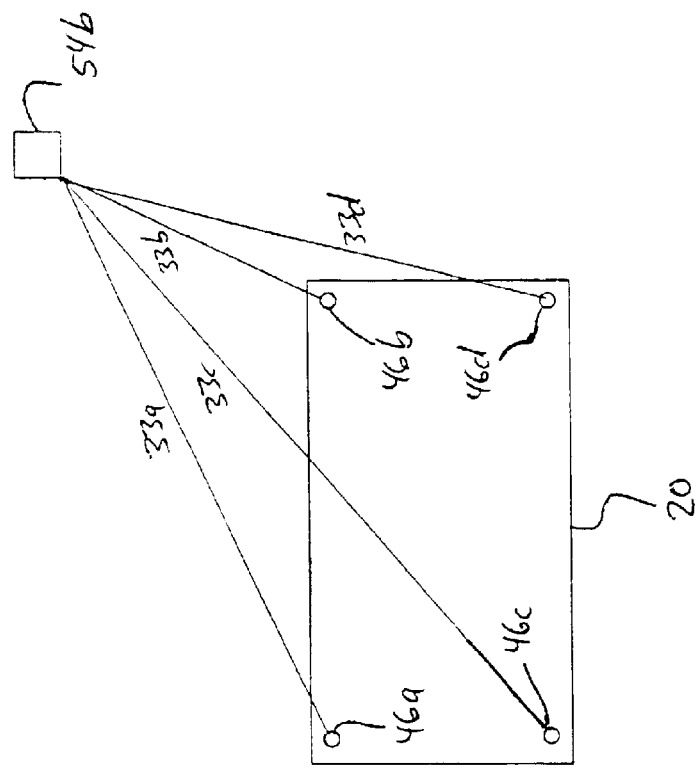
FIG. 5

MATERIAL HANDLING SYSTEMS WITH HIGH FREQUENCY RADIO LOCATION DEVICES

CROSS-REFERENCE TO RELATED APPLICATIONS

This application claims priority to commonly-assigned U.S. provisional applications No. 60/309,568 entitled Ultra-Wideband AGV System, filed Aug. 2, 2001, and No. 60/318,029, entitled Ultra-Wideband Material Handling System, filed Sep. 10, 2001, the disclosures of which are both hereby incorporated herein by reference.

BACKGROUND OF THE INVENTION

This invention relates generally to material handling systems, including sortation systems, monorail systems and the like and more particularly to navigation and/or communication systems for material handling systems.

Automatic guided vehicles, or AGVs for short, are used extensively today in a wide variety of material handling applications. AGVs come in a wide variety of types, from those that carry cargo on their back, to those that tow trains of cargo behind them on carts, to still other types. In order for each AGV to be able to automatically guide itself throughout a factory or plant, it must be able to determine its position within the factory. In the past, the determination of the vehicle's position has been carried out in several different ways. Some AGVs use laser targets positioned at known locations throughout the factory to reflect a laser beam emitted from the AGV. The reflection of the laser beams are detected by the AGV and used to determine the position of the AGV relative to the targets. Using three or more targets, the vehicle can then calculate its position. An example of such a prior art AGV system is disclosed in U.S. Pat. No. 4,790,402 issued to Field et al., the disclosure of which is hereby incorporated herein by reference.

In another type of AGV, the vehicle uses a combination of incremental sensors and one or more beacon sensors to determine its position. The incremental sensors detect changes in the vehicle's position or bearing, while the beacon sensors make absolute measurements of the vehicle's position or heading with respect to one or more fixed beacons positioned throughout the factory. By combining the use of both incremental and beacon sensors, the vehicle is able to determine its position and/or heading sufficiently often and with sufficient accuracy to guide itself to its intended destination. Examples of incremental sensors used on AGVs include wheel encoders that measure the rotations of one or more wheels on the AGV, and gyroscopes that measure changes in the vehicle's orientation. Examples of beacons include magnets buried in the floor, transponders positioned at known locations, laser targets such as those described above, and various other detectable marks or objects. One prior art AGV system that uses wheel encoders, a gyro, and magnets positioned in the floor for navigation is disclosed in U.S. Pat. No. 5,281,901 issued to Yardley et al., the disclosure of which is hereby incorporated herein by reference.

In the past, the various types of AGV systems have each suffered from certain disadvantages. In virtually all of the prior AGV systems, the measurement of the position of the beacons during their installation—whether they are magnets, transponders, reflectors, or other types—has often been a labor-intensive and expensive task. In addition, with respect to the laser-reflector AGVs, these systems require a visual line-of-sight between the vehicle and the target which can often be difficult to obtain in a crowded factory or plant environment. The use of magnets or transponders buried in the floor requires drilling or other operations that can be disruptive to the operation of the factory, and which can have significant costs. Further, the magnets or transponders must be placed on or adjacent to the vehicle pathways in order for the vehicle to be able to detect them. Changes in the pathway therefore often require the installation of additional magnets.

In addition to the foregoing disadvantages of the various navigation systems, prior art AGV systems have also had certain disadvantages in their communications systems. For example, some prior art AGV systems rely on a central controller or repeater that issues or repeats communications received from vehicles. In such systems, the vehicles do not directly contact each other, but instead channel their messages to the central controller or repeater. If a communications failure occurs with the central controller or repeater, then the whole communications system fails. Such single point of failure communication systems are desirably avoided, if possible. Additionally, prior art AGV systems have often used RF communications which are susceptible to interference, especially in plants that have extensive metal structures and electrical/electronic equipment that may emit its own radiation. These problems are also desirably avoided. The need can therefore be seen for an AGV system which overcomes the aforementioned disadvantages.

Prior AGVs have also typically included one or more bumpers on their front and/or back ends that allow the vehicle to safely stop or slow down when objects in its path are detected. Such bumpers may consist of a physical structure that produces an electric signal when impacted, optical sensors that optically detect obstacles in the vehicle's path, laser sensors that detect laser signals emitted from the vehicle and reflected off of obstacles, or combinations of these various types of sensors. One such system is described in more detail in U.S. Pat. No. 5,048,637 issued to Lomasney. While such systems have proven to be adequate, they are often expensive to implement. Furthermore, their detection range for detecting obstacles is often limited such that it is possible for small objects to escape detection by the sensor and possibly cause damage to the vehicle, the undetected object, or both. More inexpensive sensors with a broader field of vision are therefore desirable.

In addition to the use of AGVs to move material between different locations within a warehouse, conveyors and other types of material handling equipment are often used. In order to ensure that the materials are properly moved to their intended destination, they often include a bar code on one of their sides. These bar codes are read by a scanner which is in communication with the appropriate control circuitry to ensure that, after reading the bar code, the material handling system will deliver the article to its intended destination. In order for the bar code scanner to work properly, it is often necessary to make sure that all of the articles are properly oriented so that their bar codes can be read by the scanner. Further, it is often necessary to re-scan articles whose bar codes have become covered in dirt, wrinkled, or otherwise unreadable. A method of tagging articles such that these and other difficulties could be overcome is also desirable.

Sortation systems, such as of the type described in commonly assigned patent application Ser. No. 10/163,788 filed Jun. 6, 2002 by Zeitler et al., use a distributed control having modules that are distributed along a conveying surface. The relative position of the modules is often desirably known so that a higher level controller can properly control the various components of the conveyor system. In the past, the relative position of such components was often determined by normal surveying or measuring technologies. Those techniques are labor-intensive and expensive. A method of reducing those costs is therefore desirable.

Material handling systems that employ overhead electrified monorails to transport material typically use hard-wired communications to communicate with a master controller. These hard wire connections decrease the ease at which the system is installed and/or modified. These systems also typically employ relatively expensive sensors for allowing the monorail vehicle to determine when it has arrived at a particular workstation. The desirability of overcoming these and other disadvantages can be seen.

SUMMARY OF THE INVENTION

Accordingly, the present invention provides improved material handling methods that overcome the aforementioned disadvantages, as well as others. The present invention includes a material handling system that utilizes high frequency radio location transmitters and receivers, also known as transceivers or beacons, for use in navigation, communication, and/or guidance. The use of these types of transmitters and receivers eases the installation of the material handling systems, enhances the ability of the particular types of material handling systems to determine position, and allows for improved guidance of the material handling vehicles. The present invention also includes high-frequency radio tags that can be attached to articles, pallets, or other containers for tracking, routing, and monitoring of material movement in a material handling system.

According to one aspect of the present invention, a navigation system for determining the location of an automatic guided vehicle is provided. The navigation system includes a plurality of electromagnetic energy emitting beacons which are positioned at known locations in a factory or plant. At least one electromagnetic energy sensor is provided on-board the vehicle and is capable of detecting signals from the plurality of beacons, or emitting signals to the beacons. A processor in communication with either said sensor, said beacons, or both determines location of the sensor with respect to the beacons based upon the electromagnetic signals passed between the sensor and the beacons.

According to another aspect of the present invention, a kit may be provided for modifying the navigation system of an automatic guided vehicle that uses one or more incremental navigation sensors in combination with at least one beacon sensor to estimate the vehicle's position. The beacon sensor is adapted to detect beacons positioned at known locations. The kit includes a plurality of electromagnetic energy emitting beacons for positioning at known locations throughout an environment. At least one electromagnetic energy sensor is also included in the kit. The sensor is to be placed on a vehicle and it adapted to detect the signals emitted from the plurality of electromagnetic energy emitting beacons. The kit further includes a controller adapted to use the one or more incremental navigation sensors in combination with the detected beacon signals to generate an estimate of the vehicle's position.

According to another aspect of the present invention, a method is provided for installing an AGV system within an environment. The method includes providing a plurality of electromagnetic energy emitting beacons and at least one automatic guided vehicle that includes at least one sensor for detecting transmissions from the plurality of beacons. At least three of the beacons are placed within the environment in a roughly triangular geometry and the location of the beacons are measured. Thereafter, additional beacons are placed in the environment and the measured beacons are used to determine the location of the additional beacons within the environment. The position of the additional beacons is communicated to the automatic guided vehicle.

According to yet another aspect of the present invention, an automatic guided vehicle is provided that includes a body, at least one navigation sensor, a motor, an ultra-wideband radar, and a controller. The ultra-wideband radar is capable of detecting objects located off of the vehicle, and the controller is adapted to control the movement of the vehicle based, at least partially, on any objects detected by the ultra-wideband radar.

According to still another aspect of the present invention, a communications system is provided for an automatic guided vehicle. The communications system includes an ultra-wideband transmitter positioned on the vehicle that transmits information from the vehicle via ultra-wideband signals, and an ultra-wideband receiver positioned on the vehicle that receives information transmitted via ultra-wideband signals from other sources.

According to still another aspect of the present invention, a material handling system is provided that includes a plurality of automatic guided vehicles with ultra-wideband communication systems. At least one ultra-wideband transmitter is positioned on or adjacent to a load of material to be moved by one of the plurality of vehicles. The transmitter is adapted to transmit a message to the plurality of vehicles indicating that the load of material is to be moved to a destination. A controller is also provided and adapted to determine which of the plurality of automatic guided vehicles is to retrieve the load in response to the message.

According to yet another aspect of the present invention, a plurality of high-frequency electromagnetic energy tags are positioned on articles within a facility. As these articles are moved, a sensor reads the information contained in the tags and uses the information to determine where the articles are to be moved within the facility. The sensor reads the information contained in the tags by a unique pattern of reflection of the electromagnetic energy emitted by the sensor toward the tags.

The AGVs, communications systems, navigation systems, and other aspects of the present invention provide various improved features for material handling systems. Among these improved features are reduced costs, better control of material movement, easier installation of material handling systems, such as AGV systems, improved communications ability, more flexible usage of material handling equipment, and increased safety. These and other benefits of the present invention will become apparent to one skilled in the art in view of the following description when read in conjunction with the accompanying drawings.

BRIEF DESCRIPTION OF THE DRAWINGS

FIG. 5 is a schematic view of an AGV and a plurality of beacons, illustrating a second method by which the AGV determines its position and/or heading;

DESCRIPTION OF THE PREFERRED EMBODIMENTS

Figure 1:
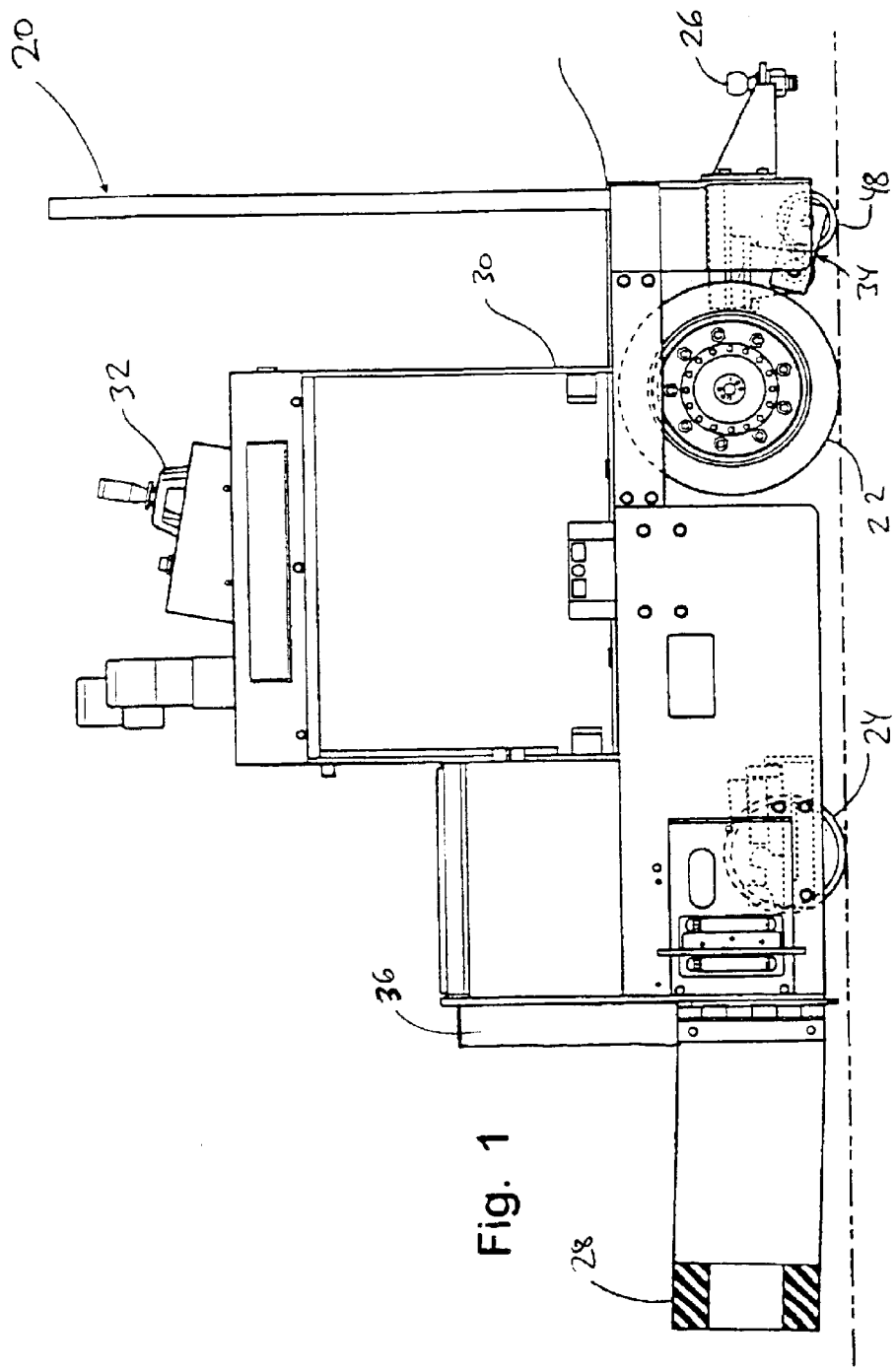
FIG. 1 is a side, elevational view of one embodiment of an AGV to which the present invention finds application.

The present invention will now be described with reference to the accompanying drawings wherein like reference numerals correspond to like elements in the several drawings. An illustrative example of a material handling system, which may be in the form of an automatic guided vehicle (AGV) 20, to which the present invention can be applied is depicted in FIG. 1. AGV 20 may be the type of vehicle which is described in more detail in U.S. Pat. No. 5,764,014 issued to Jakeway, the disclosure of which is hereby incorporated herein by reference. AGV 20 includes a plurality of drive wheels 22 which are powered by motors 23 (FIG. 2) and drive the vehicle 20. AGV 20 further includes a front, steerable wheel 24, a hitch 26 for towing trailers of material, a mechanical front bumper 28, a battery storage compartment 30 for storing the batteries that provide power to the drive wheels 22, and a local operator console 32 that allows the vehicle to be operated manually by a user. When local operator console 32 is not in use, AGV 20 guides itself automatically from destination to destination. AGV 20 may also include a ground track sensor 34 that provides navigation information to the vehicle in a manner described more fully in U.S. Pat. No. 5,764,014, and an ultra-wideband radar bumper 36 that will be described in more detail herein. It will, of course, be understood that the present invention finds equal application to other types of AGVs and that AGV 20 is only one example of the many different types of AGVs to which the present invention may be applied.

Figure 2:
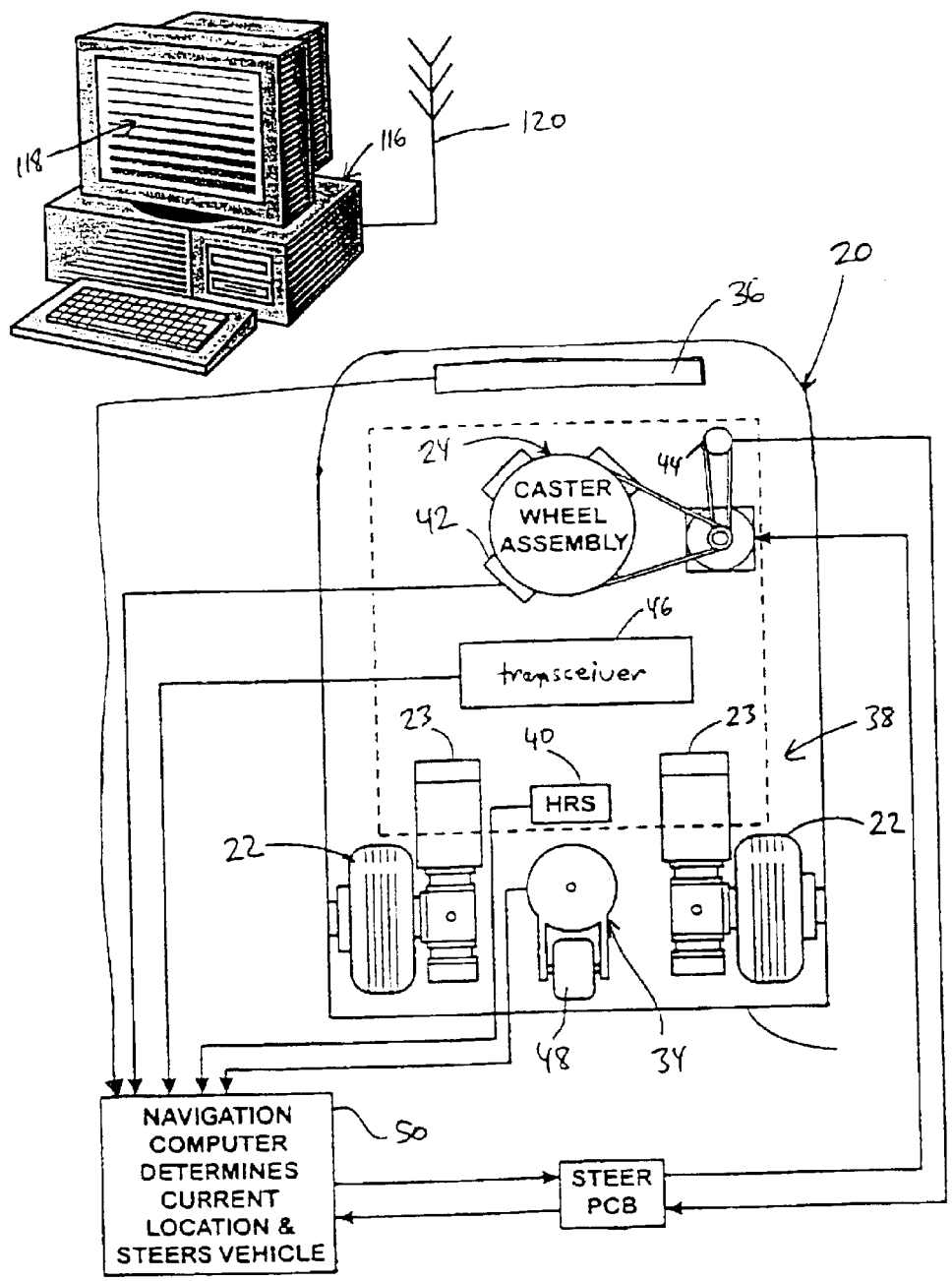
FIG. 2 is a plan, schematic view of selected components of the AGV of FIG. 1.

AGV 20 includes a navigation system 38 that is illustrated in block diagram form in FIG. 2. The navigation system 38 includes ground track sensor 34, a heading reference sensor 40, a distance measuring encoder 42, an angle encoder 44, and a high frequency radio transceiver 46. The operation of ground track sensor 34, heading reference sensor 40, distance measuring encoder 42, and angle encoder 44 is described in more detail in U.S. Pat. No. 5,764,014. Suffice it to say that ground track sensor 34 measures the rotation and angular position of a unloaded ground wheel 48. This information is fed to a navigation computer 50 which uses the information, in conjunction with other navigation information, to determine the vehicle's location and heading. Navigation computer 50 outputs commands to a steer board to steer front wheel 24 to cause the vehicle to stay on an intended path. Angle encoder 44 measures the angular orientation of a caster wheel assembly on which front, steerable wheel 24 is mounted. This angular information is also fed into navigation computer 50. Distance measuring encoder 42 measures the number of rotations of front wheel 24 and feeds this information to navigation computer 50 for use in determining the vehicle's position and heading. Heading reference sensor 70 provides information about the heading of the vehicle to navigation computer 50, and may include a gyroscope.

The gyroscope, angle and distance encoders, and ground track sensor may all be incremental sensors. That is, they may not, by themselves, be able to determine an absolute position or heading of the vehicle within a given frame of reference, but instead may only be able to sense changes in position and heading. In order to determine an absolute heading or position of the vehicle 20 within a given frame of reference, high-frequency radio transceiver 46 is provided. Transceiver 46 may be a device that sends and receives high-frequency radio signals, such as ultra-wideband signals, or other signals. Transceiver 46 may have multiple antennae placed at various points on the vehicle, allowing measurement of relative angles. These signals are used to determine the vehicle's absolute position and/or heading in a given frame of reference. In the illustrated navigation system, the absolute heading and/or position information provided by transceiver 46 to navigation computer 50 merely supplements that provided by the other navigation sensors. In this embodiment, transceiver 46 therefore does not need to provide position and heading information updates as quickly as it would if some or all of the other navigation sensors were removed. It will be understood by one skilled in the art that some or all of the other navigation sensors on vehicle 20 can be removed by simply increasing the rate at which transceiver 46 receives accurate position and heading measurement information. For example, if transceiver 46 provides updated heading information as quickly and accurately as the gyroscope in heading reference sensor 40, then heading reference sensor 40 could be discarded. Therefore, navigation system 38 may or may not include sensors other than transceiver 46. The operation of transceiver 46 will be described in more detail below.

Figure 3:
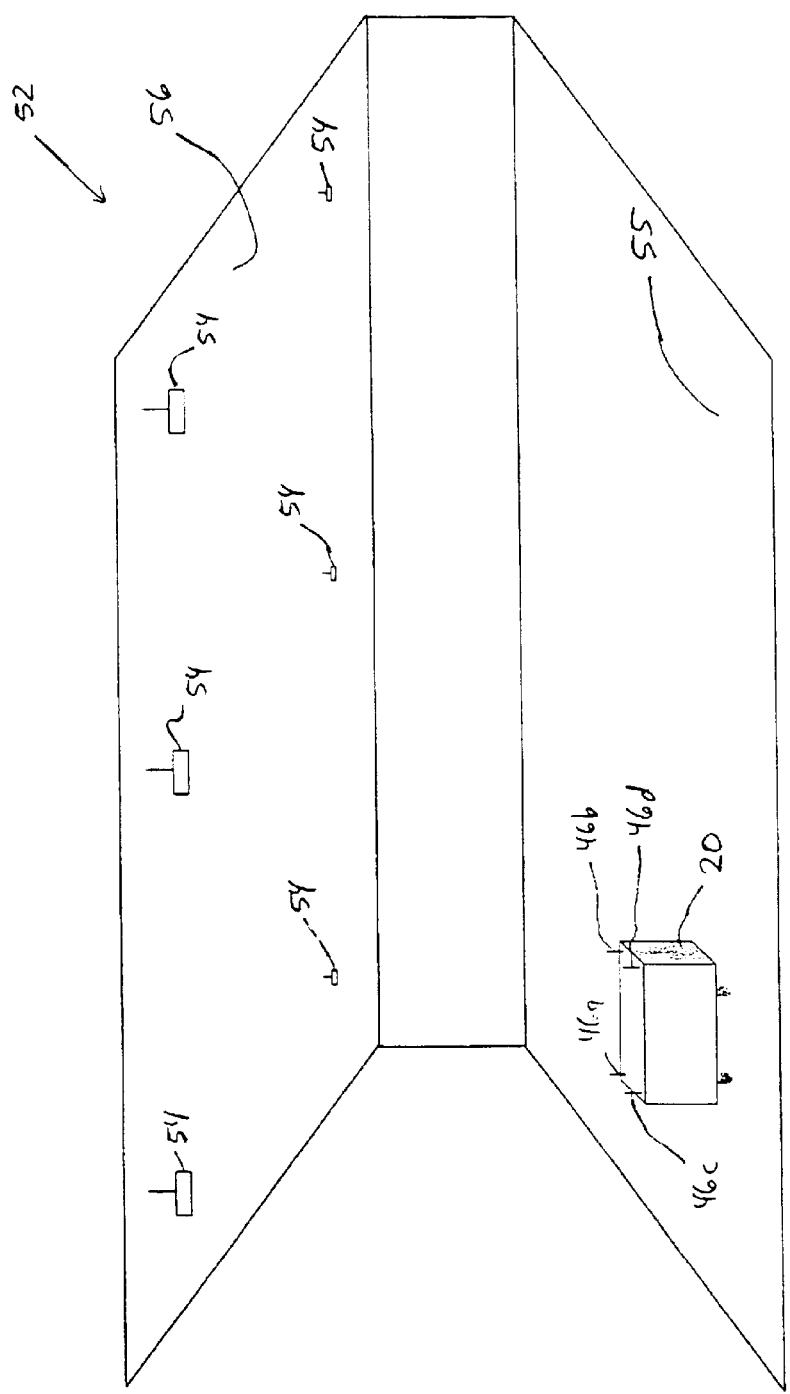
FIG. 3 is a perspective view of an AGV system according to one embodiment of the present invention.

An illustrative example of an AGV system 52 is depicted in FIG. 3. The AGV system 52 includes at least one AGV, such as AGV 20, which travels on a floor 55 throughout a plant or factory and which is adapted to carry loads. The loads may be carried on the top of the AGV, on one or more carts towed behind the AGV, or in any other manner. The AGV is able to steer itself automatically from one location to another based on instructions received from an off-board controller or from a person who manually enters an intended destination into an interface on the vehicle. As discussed above, AGV 20 includes one or more incremental navigation sensors on-board which the vehicle uses to help determine its position and/or heading. The types and number of incremental sensors are not limited within the scope of the present invention, but include such sensors as gyroscopes, wheel encoders, potentiometers, and others. Other low grade position sensors, such as flux gate compasses or magnet position sensors may also be employed. In addition to the one or more incremental and position navigation sensors, AGV 20 includes at least one transceiver 46 adapted to detect one or more stationary beacons 54 positioned at known locations throughout an environment. In the example of FIG. 3, beacons 54 are positioned along a ceiling 56. Beacons 54 could alternatively be placed at any other locations that are within range of detection by AGV 20, as will be explained in more detail below.

AGV 20 uses one or more of beacons 54 to periodically determine its position and/or heading. While AGV 20 receives information about its location and heading from the one or more incremental sensors it has on-board, these incremental sensors have to be initialized and also tend to produce errors that increase over time. Beacons 54 provide sufficient information to AGV 20 to allow itself to both initially determine its position, and to update its position and/or heading periodically as it travels throughout the plant. AGV 20 detects the one or more beacons 54 by way of one or more transceivers 46 positioned on-board vehicle 20. (FIG. 2). In one embodiment of the present invention, beacons 54 may be various types of high frequency radio location devices such as the ultra-wideband transceivers disclosed in U.S. Pat. No. 6,054,950, issued to Fontana, the disclosure of which is hereby incorporated herein by reference. Transceivers 46 on-board the vehicle may be ultra-wideband receivers/processors, such as those disclosed in U.S. Pat. No. 6,054,950. In another embodiment of the present invention, beacons 54 are FMCW devices, such as those disclosed in U.S. Pat. Nos. 6,255,984 issued to Kreppold, et al. and 6,278,398 issued to Vossiek, et al., the disclosures of which are both hereby incorporated herein by reference. Any other types of high frequency location devices that fall within the 3–6 Gigahertz range, which was recently approved for ultra-wideband uses in the United States by the U.S. Federal Communications Commission, could also be used, although frequencies outside this range may also be used. Still other types of high frequency location devices may also be used, such as frequency modulated radar systems and the like.

Figure 4:
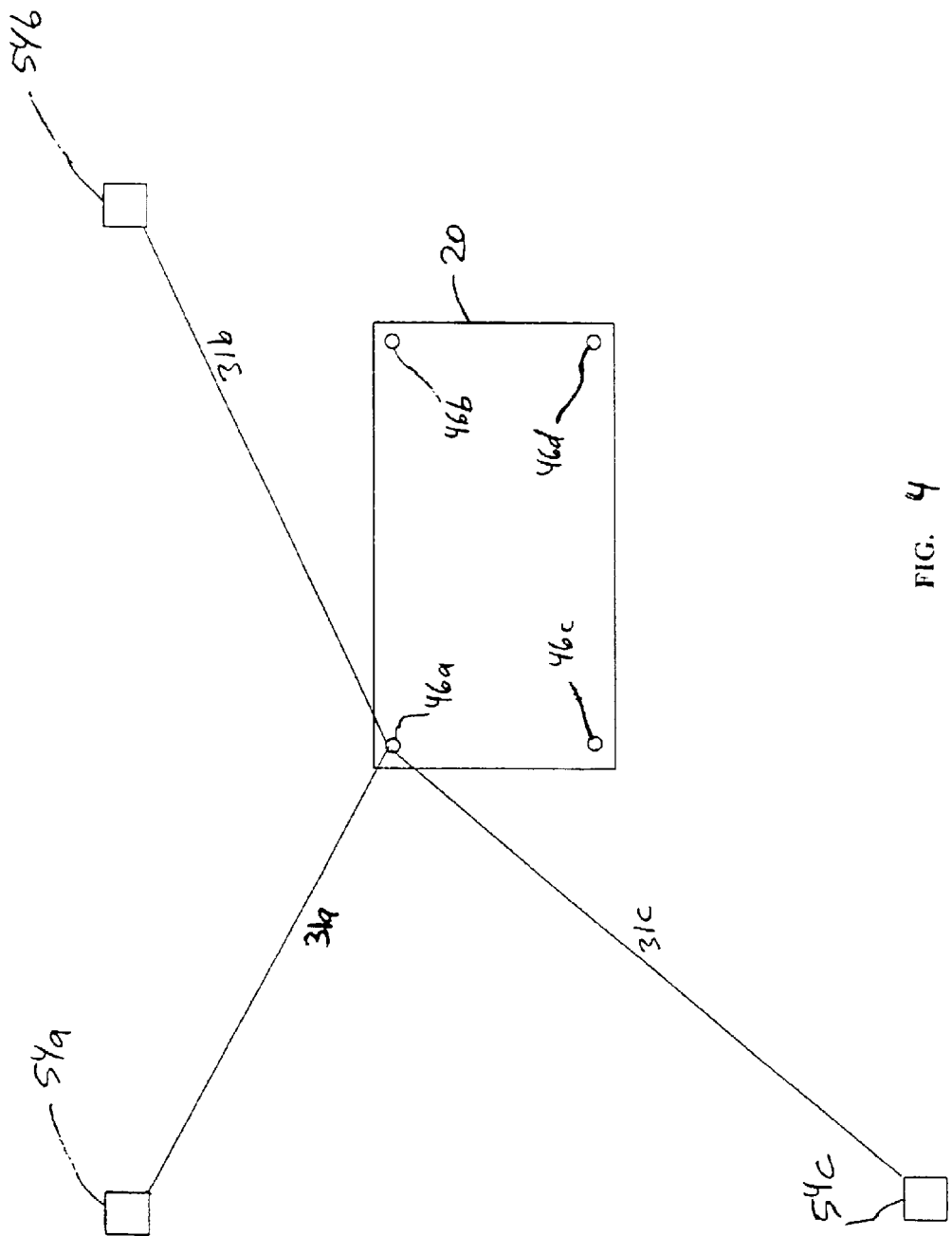
FIG. 4 is a schematic view of an AGV and a plurality of beacons, illustrating a first method by which the AGV determines its position and/or heading.

Beacons 54 are installed at known locations throughout an environment in which one or more AGVs 20 are to operate. The location of beacons 54 is communicated to each of the AGVs 20 in any known manner, such as by wireless transmission, manual entry, downloading, or by any other means. Each AGV 20 uses signals transmitted between one or more beacons 54 and the transceiver(s) 46 it has on-board to determine its position and/or heading. An example of the manner in which the AGV is able to determine its position from the beacons 54 is depicted in FIG. 4. Each beacon 54 emits a short, electromagnetic pulse that is detected by the one or more transceivers 46 located on AGV 20. By determining the time of flight for the emitted pulse to travel from one beacon 54 to a transceiver 46, AGV 20 is able to calculate the distance between the beacon 54 which emitted the pulse and the transceiver 46 which detected the pulse. By determining the transceiver's distance to three or more beacons 54, the vehicle is able to determine its position within the facility.

For example, if beacon 54a in FIG. 4 emits a pulse that takes 5 nanoseconds to travel to transceiver 46a, then a distance 31a between transceiver 46a and beacon 54a can be computed by multiplying the propagation speed of the pulse by the time-of-flight. If the propagation speed is taken to be 300,000,000 meters/second, then the distance 31a is 1.5 meters (300,000,000 m/s times 0.000000005 s). It is therefore known that transceiver 46a lies somewhere on a sphere having a radius of 1.5 meters centered at beacon 54a. In order to further pinpoint the location of transceiver 46a within the facility, additional distance measurements can be taken from other beacons, such as distances 31b and 31c, which correspond to the distances to beacons 54b and 54c (FIG. 4). Taking such measurements from at least three beacons should provide sufficient information for AGV 20 to be able to calculate its position within the facility, as would be understood by one skilled in the art. Such calculations can take place by any conventional means, such as by using one or more microprocessors, or by other means. In the illustrated embodiment, navigation computer 50 may be programmed to carry out these calculations. Alternatively, a separate processor associated directly with transceiver(s) 46 can perform these calculations and communicate the result to navigation computer 50. The details by which transceiver 46 determine their position from beacons 54, in one embodiment, are described more fully in U.S. Pat. No. 6,054,950.

In order to improve the accuracy of the measurement of the distance between vehicle 20 and beacon 54a, AGV 20 may include a plurality of transceivers 46 arranged in an array of known configurations. The distances of each transceiver 46 to beacon 54a can first be determined and then combined together, such as by averaging or other methods, to produce an estimate of vehicle position relative to beacon 54a with greater accuracy. For example, if each transceiver 46a–d in FIG. 4 measures it position away from beacon 54a by determining the time of flight of a pulse emitted from beacon 54a, these four distance determinations can be combined to produce a better estimate of the vehicle's distance from beacon 54a, provided the location of each of the transceivers on-board the vehicle is known. After making a measurement of the vehicle's distance from beacon 54a, vehicle 20 can proceed to make additional distance measurements from other beacons 54 in a like manner and use these distance measurements to determine its position. As would be understood by one skilled in the art, the multiple measurements of vehicle distance should be made simultaneously, or nearly simultaneously, before they are combined together in order to avoid the need for accounting for possible movement of the vehicle between distance measurements. If the measurements are not made nearly simultaneously, such movement can be accounted for prior to combining the multiple measurements by way of the other navigation sensors, or by other methods, as would be understood by one skilled in the art.

In addition to determining the position of AGV 20, beacons 54 and transceivers 46 can be used to calculate the vehicle's heading. Such heading calculations can be accomplished, in one embodiment, by determining the location within the facility of two transceivers 46 on-board AGV 20. Provided the orientation of the vehicle transceivers with respect to the vehicle is known, the heading of the vehicle can be calculated. For example, suppose transceivers 46a and 46b are mounted to a vehicle such that a line drawn between the two transceivers points in the direction considered to be the heading of the vehicle 20. Suppose further that the vehicle determines the position of transceiver 46a within a facility to be $(x_a, y_a)$, and the position of transceiver 46b to be $(x_b, y_b)$, where the letters x and y refer to the two-axes of a coordinate frame of reference. The vehicle can compute its heading within this frame of reference according to the following formula:

$$\text{heading} = \text{tangent}[(y_a - y_b)/(x_a - x_b)]$$

The computed heading will be an angular measurement from the x-axis of the coordinate frame of reference. An infinite heading will correspond to the vehicle pointing parallel to the y-axis, while a heading of zero will correspond to the vehicle pointing parallel to the x-axis. The sign of the heading can be used to determine which end of the vehicle is pointing in the direction of the calculated heading, as would be understood by one skilled in the art. By making heading determinations based upon measurements from each of the four transceivers 46a–d on-board vehicle 20, six different heading measurements can be made. (The four transceivers 46a–d can be combined into six different unordered pairs, and each unordered pair used to calculate the vehicle's heading.) Combining these six measurements, such as by averaging, can yield an improvement in the accuracy of the resulting heading estimate.

The calculation of heading according to the above equation will produce a result that corresponds to the direction in which the vehicle is pointing. As is known in the art, the direction in which the vehicle is pointing does not always equal the direction in which the vehicle is moving. For example, during turns or situations in which the vehicle may slip sideways, the vehicle may move in directions other than the direction in which it is pointed. In order to calculate the direction of the vehicle's movement in such situations, successive determinations in time of the vehicle's position can be used, as would be known by one skilled in the art.

The transmission of signals from beacons 54 can be synchronized in a wide variety of manners. One such manner uses a synchronization pulse that is transmitted to the beacons in either a wire or wireless fashion. The propagation time of the synchronization pulses to the various beacons should, of course, be taken into account when using this method. Other synchronization methods are disclosed in the prior art, such as in U.S. Pat. No. 6,054,950 that can be used. In order to differentiate between pulses emitted from different beacons 54, each beacon 54 may be assigned a unique pulse pattern that is communicated to, and stored in the memory of vehicle 20, preferably at the time of the system installation. When transceiver 46 detects a particular pattern of pulses, it checks its memory for that signature pulse pattern to determine which beacon 54 emitted the pulse. Further, because vehicle 20 also stores the location of each beacon 54 in memory, it can correlate the detected pulse pattern to a particular location within the facility, thus enabling the vehicle to use the transmitted signals for position and heading determinations. In order to avoid conflicting signals being broadcast, beacons 54 are designed to emit pulses only during defined time periods. When pulse patterns are emitted from beacons 54, the particular pulse which is used for time of flight or time or arrival measurements can be any one or more of the multiple pulses emitted in the pattern.

As an alternative to emitting pulse patterns, beacons 54 could simply be assigned certain time slots in which they broadcast one or more pulses. The assignment of time slots to individual beacons 54 is communicated to vehicle 20 so that vehicle 20 can determine which beacons' signals transceiver(s) 46 may be detecting at any given moment and correlate this information to the correct position location of the beacon. The assignment of time slots may preferably include time slots in which communications other than those in which time of flights or time of arrivals are measured. For example, some time slots may be used to send synchronization signals between beacons 54 and/or transceiver 46 in order to allow the flight times and/or arrival times of various signals to be accurately measured and utilized. As another example, some time slots may be used to send communications to and from a central controller, other vehicles, or other devices.

The time it takes for signals detected by transceiver(s) 46 to be processed should be known. One manner of doing this involves knowing the physical distance between each transceiver and a processor that processes the detected signals so that the time it takes for signals to travel along the one or more wires to the processor can be accounted for. Alternatively, each transceiver 46 may be programmed to time-stamp each signal it detects from a beacon 54. The time stamp can be used to ensure that accurate measurements of flight times or arrival times are made. If multiple transceivers 46 are on-board a vehicle, such it is important to ensure that such time stamping each transceiver 46 is synchronized with the other transceivers. Such synchronization can be carried out using a synchronization pulse, or by other means. The on-board synchronization can be further enhanced by using interferometric methods. Such interferometric methods can significantly increase the precision of the synchronization of the transceivers, thereby increasing the precision by which the differences in arrival times are measured, which in turn increases the accuracy of the vehicle's position and/or heading measurement.

As an alternative to the above-described methods for determining the heading and position of AGV 20, the heading and position of the vehicle can be determined without calculating the flight times of signals emitted from beacons 54. In such an alternative embodiment, the position and heading of the vehicle 20 is determined by comparing the differences in time in which one or more signals from a beacon 54 are detected by three or more transceiver antennae 46 positioned on the vehicle at known locations. This method is illustrated in FIG. 5. By using this method, it is not necessary to know precisely when a signal was emitted from a beacon 54. For example, suppose beacon 54*b* in FIG. 5 emits a signal. This signal will travel a distance 33*a* before it reaches, and is detected by, transceiver 46*a*. Likewise, the signal will travel distances 33*b*–*d* before it reaches, and is detected by, transceivers 46*b*–*d*, respectively. Because the distances 33*a*–*d* are different from each other, the time at which transceivers 46*a*–*d* will detect the emitted signal will be different from each other. By comparing the relative times at which the signal is detected by the different transceivers, the position of the vehicle with respect to beacon 54*b* can be determined. This is true regardless of whether the time of detection of the signal at each of the transceivers 46*a*–*d* is different or simultaneous. Of course, it is necessary to know the relative positions of transceivers 46*a*–*d* with respect to each other on the vehicle.

The exact number of transceivers 46*a*–*d* necessary to determine the position of the vehicle will be partially dependent upon the arrangement of the beacons 54. If all of the beacons are placed above the vehicle, the vehicle can use this information when the calculations of the vehicle's position yield two possible solutions, one of which is knowingly impossible—such as where one solution indicates the beacons are below the vehicle when in fact they are all positioned above the vehicle. In such a case, the vehicle would know that only the solution yielding a beacon position above the vehicles could be valid. If beacons are to be placed both above and below the vehicle, it may be necessary to add one more transceiver on vehicle 20 than would otherwise be necessary in order to determine the vehicle's position. Further, if all of the beacons 54 are placed in a plane, the vehicle can use this information to reduce the number of transceivers 46 which the vehicle would otherwise require, particularly if the vehicle only travels on a floor that is planar and parallel to the plane of the beacons. The number of transceivers 46 on vehicle 20 necessary for the vehicle to determine its position is therefore dependent upon the arrangement of beacons 54, as would be known by one skilled in the art.

The heading of the vehicle can also be determined by measuring the differences in arrival times of a beacon signal at the multiple transceivers 46 on the vehicle. Such a heading computation can be carried out, in one embodiment, by first determining the position of one of the transceivers 46 relative to the beacon 54 which emitted the signal. The heading can be computed by calculating the location of at least one other transceiver and then comparing its position to the position of the first transceiver.

In order to improve the accuracy by which the vehicle determines it position and/or heading based on differences in arrival times of an emitted signal, multiple signals can be transmitted from different beacons. The multiple signals should be transmitted in a time interval that is small enough such that the vehicle's position will remain substantially the same—or will have changed by an amount that can be measured or estimated—over the span of this time interval. For example, beacon 54a might transmit a single signal that is detected by multiple transceivers 46 on vehicle 20. Based on the times at which this signal arrives at each of the multiple transceivers, the vehicle can calculate its position and heading. Immediately after beacon 54a broadcasts its signal, another beacon, such as beacon 54b, could then emit a signal. The vehicle 20 could then use this signal from beacon 54b to perform another calculation of its position and heading. Assuming that the vehicle's position or heading has changed negligibly—or by an amount that can be estimated or measured—in the time interval between the signals from beacons 54a and 54b, the two calculations of the vehicle's position and heading could be combined to produce a more accurate measurement of heading and position. The combining of the calculations could be done by a simple averaging process, a least square method, or other methods. The accuracy of the determination of the vehicle's position and heading could be further enhanced by using measurements based on additional beacons, such as a third, a fourth, or even more beacons. As noted above, the calculations of the vehicle's heading and/or position can be performed by one or more processors, or by any other suitable means.

Figure 6:
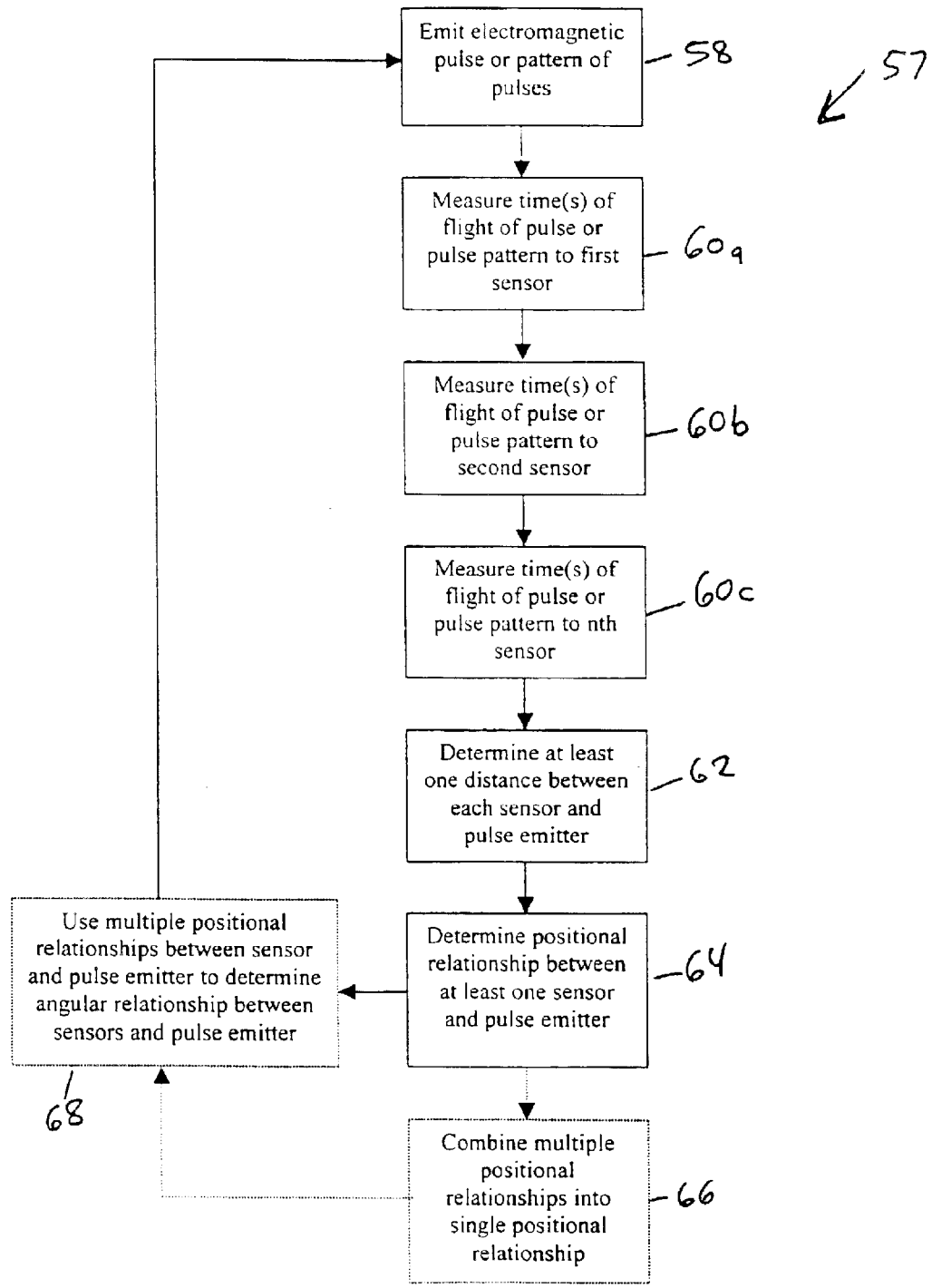
FIG. 6 is a flowchart of one method of determining heading and/or position information of a mobile unit.
Figure 7:
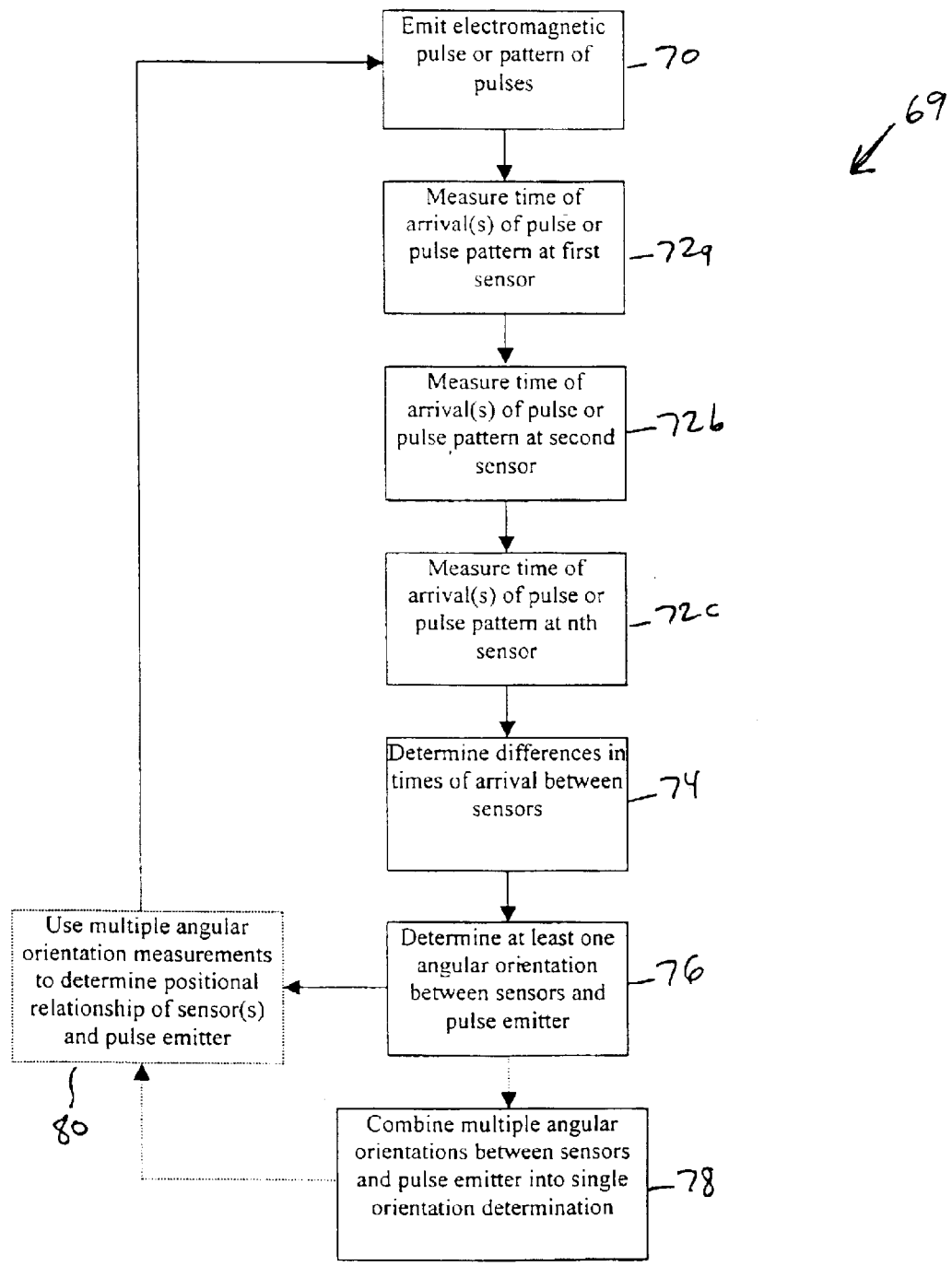
FIG. 7 is a flowchart of another method of determining heading and/or position information of a mobile unit.

The different methods for determining the vehicle's position and heading are summarized in flowcharts in FIGS. 6 and 7. In a first method 57 for determining the vehicle's position and reading illustrated in FIG. 6, one or more pulses are emitted at a step 58. The pulses may be emitted from a transceiver 46 aboard the vehicle, or they may be emitted from a beacon 54. At step 60, the time of flight of the emitted pulse to a first sensor is determined. The reference to a sensor in FIGS. 6 and 7 refers to transceiver 46 if the emitted signal came from a beacon 54, or to a beacon 54 if the emitted pulse came from transceiver 46. It will be understood by those skilled in the art that the present invention finds equal application to those systems in which times of flight or arrival times are measured based on signals emitted from the vehicle to the beacons, or vice versa. At step 60a, the time of flight of the emitted signal to a second sensor is determined. At step 60c, the time of flight of the emitted signal to another sensor is determined (the $N^{th}$ sensor). The total number of sensors used to measure time of flights is represented by the variable N, and N may be any integer greater than or equal to one. Steps 60b and c therefore may be optional in some embodiments. After all of the time of flight measurements have been made, the distances from the pulse emitter to each pulse sensor is determined at step 62. The distance information is used to determine a positional relationship between the emitter and at least one sensor at step 64. The positional relationship may be an absolute measurement of the vehicle's position within a facility, or only a relative measurement of the vehicle's position to one or more beacons 54, depending on the number of time of flight measurements used. After step 64, method 57 may include an optional step 66 in which multiple positional relationships between the emitter and multiple sensors are combined into a single positional relationship. This optional step may be used when multiple sensors are present. By combining the positional relationship from multiple sensors into a single measurement, which may be done by averaging, a least square method, or other means, a more accurate positional relationship may be generated. The measurements are combining based upon the knowledge of the physical location of each of the sensors relative to each other. At another optional step 68, the heading of the vehicle may be determined based upon multiple position determinations from either step 64 or step 66. Optional step 68 is implemented after method 57 has cycled through steps 58–64 a sufficient number of times to provide sufficient position information by which the heading of the vehicle can be determined.

A second method 69 of determining position and/or heading is illustrated in FIG. 7. In method 69, one or more electromagnetic pulses are emitted at step 70 in the same manner as in step 58. At steps 72a,b,c, the arrival times of the emitted pulse at one or more sensors are determined. The number of sensors can be varied between two or more. The differences in the arrival times are determined at step 74, and these differences are used to calculate an angular orientation between the emitter and sensors at step 76 in a manner that would be known to one skilled in the art. At step 78, which is optional, multiple angular orientations calculated in step 76 can be combined together into a single calculation of angular orientation, such as by averaging, a least square method, or other means. The angular orientation measurements from steps 76 and 78 can optionally be used to determine the vehicle's position at step 80. Step 80, like step 68 in method 57, can take place only after method 69 has cycled through steps 70–76 multiple times. The steps of methods 57 and 69 may take place completely on-board vehicle 20, completely off-board vehicle 20, or some combination thereof.

While the above-description of beacons 54 and transceivers 46 has been based upon these devices communicating via ultra-wideband signals, it will be understood that the scope of the invention is not limited to the use of only ultra-wideband signals. Rather, the invention finds application in any electromagnetic energy emitting transmitters and receivers wherein the transmitted signals are sufficiently defined to be able to accurately determine when the signal was emitted, when the signal was detected, or both. Alternatively, frequency modulated continuous wave radar systems can be used for position and heading determinations, although other systems will suggest themselves to be skilled artisans. In addition to the beacons 54 and transceivers 46 described above, beacons 54 and transceivers 46 could alternatively comprise the localizers described in U.S. Pat. No. 6,002,708 issued to Fleming et al., the disclosure of which is hereby incorporated herein by reference.

The use of beacons 54 and transceivers 46 for the navigation of AGV 20 can be augmented by using one or more incremental sensors, as noted above. Such incremental sensors are particularly desirable if beacons 54 and transceivers 46 do not provide fresh measurements of position or heading with sufficient frequency to properly guide the vehicle. The measurements of heading and/or position obtained from beacons 54 and transceivers 46 can be combined with the position and heading information from the one or more incremental sensors to produce a more accurate estimate of the vehicle's heading and/or position. The combination of the incremental sensor information and the beacon/sensor information can be accomplished in any conventional manner, including through the use of a Kalman filter. A Kalman filter can be used with any of the methods for determining heading or position described above.

Navigation system 38 utilizes beacons 54, transceiver(s) 46, and one or more processors, either separate from or part of navigation computer 50, for combining and processing the signals received by transceivers 46. The navigation system can be used either alone or in combination with other navigation sensors, such as the incremental sensors described above. If used in combination with other incremental sensors, the navigation system can be installed on original vehicles, or it can be added to existing AGVs. For example, the navigation system of the present invention could be installed as a retrofit kit on pre-existing vehicles, such as, for example, those described in U.S. Pat. No. 5,280,901. Such vehicles use a gyroscope, wheel encoders, and a magnet sensor that detects magnets positioned at known locations on the floor of a plant to navigate. By installing the navigation system of the present invention on such a vehicle, one or more of the gyroscope wheel encoders and magnet sensors can be removed and replaced with the beacon/transceiver system of the present invention, which would provide the same or comparable navigation as the removed sensor or sensors. A navigation kit according to the present invention provides periodic updates of the vehicle's position and heading that allow it to replace one or more of these sensors. The navigation system of the present invention could therefore replace the magnet sensors of the vehicles disclosed in the '901 patent. Instead of using magnets for periodic updates, the vehicle would use the beacons and sensors for periodic updates of position and heading. Because the magnets have to be positioned on or adjacent to the AGV's pathway, and the beacons 54 do not, such a replacement would allow the vehicle's pathways to be easily changed without having to relocate magnets or beacons. The navigation system of the present invention could also eliminate the need for the gyroscope and one or more of the wheel encoders. The navigation kit of the present invention could also be used to replace one or more navigation sensors on other types of vehicle's, such as those that use laser reflectors or those that use transponders buried in the floor, as well as other types.

The installation of AGV system 52 can be easily accomplished. Beacons 54 are mounted in any known manner at locations throughout the facility, such as on a ceiling, on the tops of racks or other stationary structures, in the floor, or in still other locations. Once one or more of these beacons have been installed, the position of at least three beacons are determined by surveying or other means. After the location of these first beacons are determined, the position of the other beacons can be determined in a variety of manners using common surveying techniques for measurement of beacon relative locations and subsequent error reducing analytical algorithms. The need to physically survey every single beacon in the facility during installation can therefore be avoided. In order for the beacons to be able to determine their positions with respect to each other, it is necessary for them to be able to both transmit and receive signals, i.e. to be transceivers. Transceivers that can be used for this purpose are described in the U.S. Pat. No. 6,054,950 patent.

It will be understood that the foregoing description of the use of one or more transceiver 46 on board AGV 20 does imply that only transceivers can be used on board vehicle 20 in accordance with the present invention. For example, in situations in which beacons 54 emit signals detected by transceivers 46 and used to determined the vehicle's position and/or heading, transceivers 46 could simply be receivers. Alternatively, in situations in which transceivers 46 were used to emit signals detected by beacons 54, transceivers 46 could simply be transmitters. Likewise, beacons 54 could be either transmitters or receivers in these different situations. The term "beacon" as used in this application is therefore intended to cover receivers, transmitters, and transceivers.

In addition to using ultra-wideband signals for determining the location and/or heading of AGV, ultra-wideband signals can be used for communication in material handling systems, such as AGV system 52. Using previously disclosed embodiments as an example, each AGV includes an ultra-wideband transceiver that may or may not be the same as a transceiver 46. The communication can be directly between vehicles, between each vehicle and a central station, or some combination thereof. The communications can include any type of information, such as destination information, load information, blocking information, or other information. By using ultra-wideband signals for communication, the communications can be more secure from interference. Such communication could be accomplished by transmissions during the intervals between navigation signals from the beacons, or the navigation signals from the beacons could themselves be sent with a certain order and/or frequency that defined one or more messages. The ultra-wideband communications could also be implemented on AGVs that did not use ultra-wideband navigation techniques.

High frequency radio transmitters, such as ultra-wideband transmitters, can also be placed on or adjacent to loads to be picked up by an AGV. Such transmitters may broadcast one or more messages indicating that a load is to be transported, the contents of the load, the destination of the load, or other information concerning the load. The initiation of such signals can be implemented by a worker pressing a button on the transmitter, or by taking other steps to cause the transmitter to transmit such a message. The transmitter may also broadcast its location, or signals sufficient for the AGVs to determine its location. Each AGV may include a controller for determining which of the available AGVs should respond to the message, or a central controller may dictate which AGV should respond to the message. Such transmitters allow loads to be monitored by a central control system throughout their movement in the facility. The transmitters may also respond to a centralized request for information in order to allow automatic inventories to be taken of material in a facility.

Beacons 54 could also be placed on individual AGVs, other mobile vehicles in the facility—such as driver-guided fork-lift trucks—or on stationary objects, in order to avoid collisions with these objects. By being able to determine its location with respect to beacons 54, vehicles 20 steer themselves accordingly to avoid collisions with certain designated beacons, such as those on fork-lift trucks or at other occupied locations. When vehicle 20 detects that it is within a certain vicinity of a beacon 54 that it should avoid, such as one on a fork-lift truck, a controller on vehicle 20 implements an appropriate velocity change to help avoid a collision with the fork-lift truck. In this manner, plant safety can be improved while minimizing the costs associated with collisions.

Figure 8:
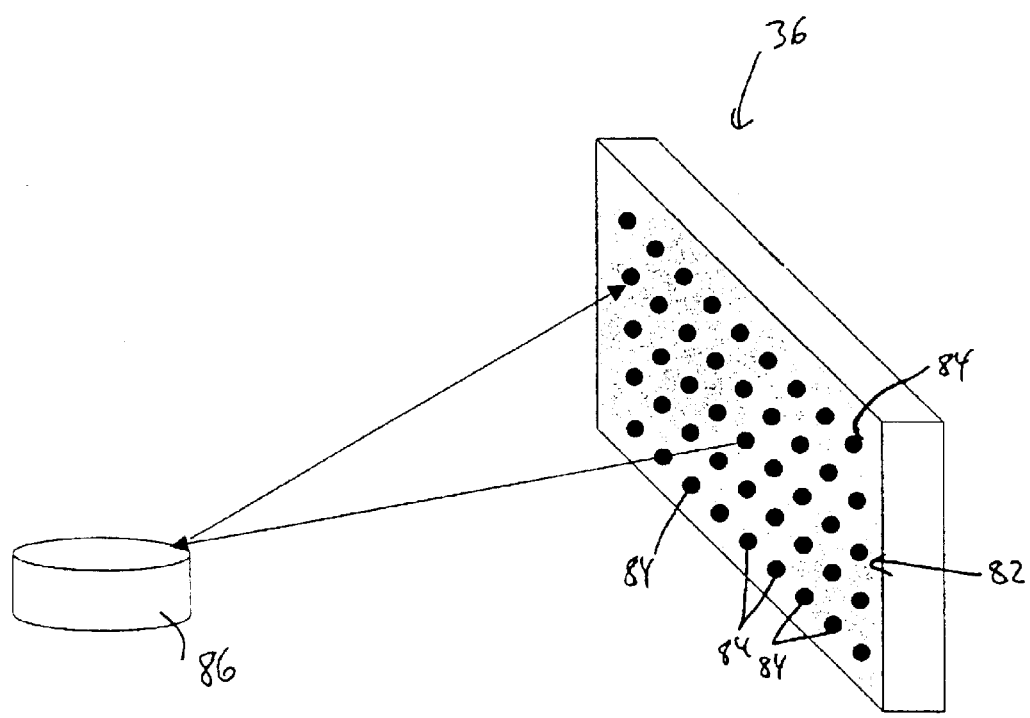
FIG. 8 is a perspective view of an ultra-wideband radar bumper for a mobile vehicle.

According to another aspect of the present invention, AGV 20 includes a high frequency radio radar module or bumper 36 located at a position on the vehicle that enables it to detect nearby objects (FIG. 1). The high frequency radio radar can be any conventional module, such as the ultra-wideband radar modules disclosed in U.S. Pat. No. 5,805,110 issued to McEwan, the disclosure of which is hereby incorporated herein by reference. Alternatively, the radar bumper could comprise a phased array of high frequency radio antennas 82 (FIG. 8). A high frequency pulse is emitted from one of the individual antennas 84 and it reflects off of an object 86 back to the array 82. The antennas 84 detect the reflected signal at different times based upon the location of object 86. A processor compares these different detection times to determined the position of the object in a manner that would be known to one skilled in the art. While radar bumper 36 is depicted as a single bumper on the front of vehicle 20 in FIG. 1, it will be understood that multiple radar bumpers could be incorporated onto a vehicle, such as at the back of the vehicle, which is particularly useful for vehicles that are capable of bi-directional travel. For vehicles capable of side-to-side movement, additional radar bumpers 36 could be placed on the sides of the vehicle to determine whether obstacles are blocking the vehicle's side-to-side movement. The detectable range of the radar bumpers 36 can be set to any desirable distance, but would preferably be very close to the vehicle for side bumpers 36, in front of mechanical bumper 28 for the front bumper 36, and close to the back end of the vehicle for rear bumper 36. Object detection range can also be controllable during operation to allow a safety zone tailored to the vehicle's current task. The detected information from bumper 36 could be forwarded to navigation computer 50, which would issue any appropriate steering commands to make in light of the detected object.

The high frequency radio radar module 36 can be used for a variety of purposes. The radar can be used to detect objects that obstruct the path of the vehicle, such as other vehicles, fork-lift trucks, pallets, personnel, or any other objects that might get in the way of a vehicle's path. In such situations, AGV 20 may be programmed to either stop and wait until the obstruction is removed, or to follow an alternate route to avoid the obstacle. Alternatively, the radar can be used for accurately stopping the vehicle at transfer stations, battery recharging stations, or any other locations where the vehicle must be accurately positioned. When accurately stopping at a station, the radar indicates to the vehicle its distance from a reference structure at or near the station. The vehicle stops itself at a predetermined location with respect to the reference structure. The reference structure can be any structure which is detectable by high frequency radio radar, including structures that exist within the facility prior to the AGV installation, or structures that are specifically added to provide references for the AGVs. The reference structures may be different for different stations, and AGV 20 is programmed to store the appropriate data concerning the reference structure for each station.

The high frequency radio radar module can also be used for picking up loads that are not oriented at pre-determined orientations, such as loads that are deposited on the floor or other structure from a fork-lift truck. If AGV 20 is equipped with a fork-lifting capability, the high frequency radio radar module can be positioned to detect the orientation of the pallet. Based on the detected orientation of the pallet, AGV 20 steers itself appropriately to insert its fork-lift prongs into the pallet, pick it up, and transport it to an intended destination. The various uses for the high frequency radio radar module described above are not mutually exclusive, but rather a single AGV can use one or more radar modules to perform each of the functions described above, as well as other functions.

According to still another aspect of the present invention, beacons 54 and transceivers 46 can be used as a position monitoring system for monitoring the position of AGVs, manned vehicles, such as fork-lift trucks, material loads, or a mix of these items. Such monitoring systems can be used independently of any navigation functions provided by beacons 54 and transceivers 46, or they can be used in combination with such navigational functions. For example, a plurality of beacons 54 can be positioned at known locations throughout an environment and one or more transceivers 46 can be positioned on-board the vehicle(s) and/or loads, or vice versa. The vehicle may be either an AGV, a manned vehicle, or some other type of mobile unit. The load may be a fork-lift pallet, a carton, an individual package, or some other material unit whose position may change in the facility. The position of the load and/or the vehicle is determined in accordance with one of the methods previously described. The heading of the vehicle can also be determined in accordance with one of the methods previously described.

The location of the vehicle and/or load may then be periodically transmitted to a processor, such as a central control station, a computer, or some other type of processor. FIG. 2 illustrates a computer, 116 which may receive wireless transmissions via antenna 120 from transceivers 46 of vehicle 20's location and/or heading. The processor may visually display the location of the vehicle and/or load, such as via a computer monitor; may record the movement of the vehicle and/or load over a given time period for later viewing or analysis; or may perform a combination of both of these functions. In FIG. 2, computer 116 includes a display 118 for displaying the position of vehicle 20, and computer 116 may be programmed to record and analyze the movement of vehicle 20 over time. If the processor includes a visual display, such as display 118, the movement of the mobile units and material throughout the environment can be monitored by a person. If the processor records the movements of the mobile units, this information can later be analyzed to determine the efficiency of the movement of the mobile units, the amount of usage of certain vehicles, and other aspects. The processor may be located anywhere, including on one of the vehicles, off of the vehicles at a location within the environment, or even outside the environment of the mobile units. The transmission of the position information to the processor may be accomplished by radio signals, ultra-wideband signals, hard wires, or by other means. In addition to transmitting the position information of the mobile unit to a processor for monitoring purposes, the position information can also be used by a controller on-board the vehicle for navigation and steering, as discussed above.

The monitoring of mobile units and/or material can be accomplished by having the individual transceivers 46, and associated circuitry, determine their position and/or heading, and then transmit this information to a central monitoring device. Alternatively, the central monitoring device can determine the mobile unit's and/or material's location directly. Because transceivers 46 and beacons 54 are only being used to monitor the location of mobile object, rather than to provide navigation information, in this embodiment, the rate at which updated position information is provided can be substantially less than for those applications in which navigation information is generated. For example, for the monitoring of mobile loads, it may be sufficient to provide updated position information every five seconds where the vehicle travels up to one meter/second and the location information is accurate to approximately thirty seconds. If the vehicles travel up to nine/meters per second, and the position accuracy is less, such as one meter, it may be desirable to increase the position updates, such as up to one per second. These update rates are only illustrative examples, and other update rates can, of course, be used with the present invention.

Figure 9:
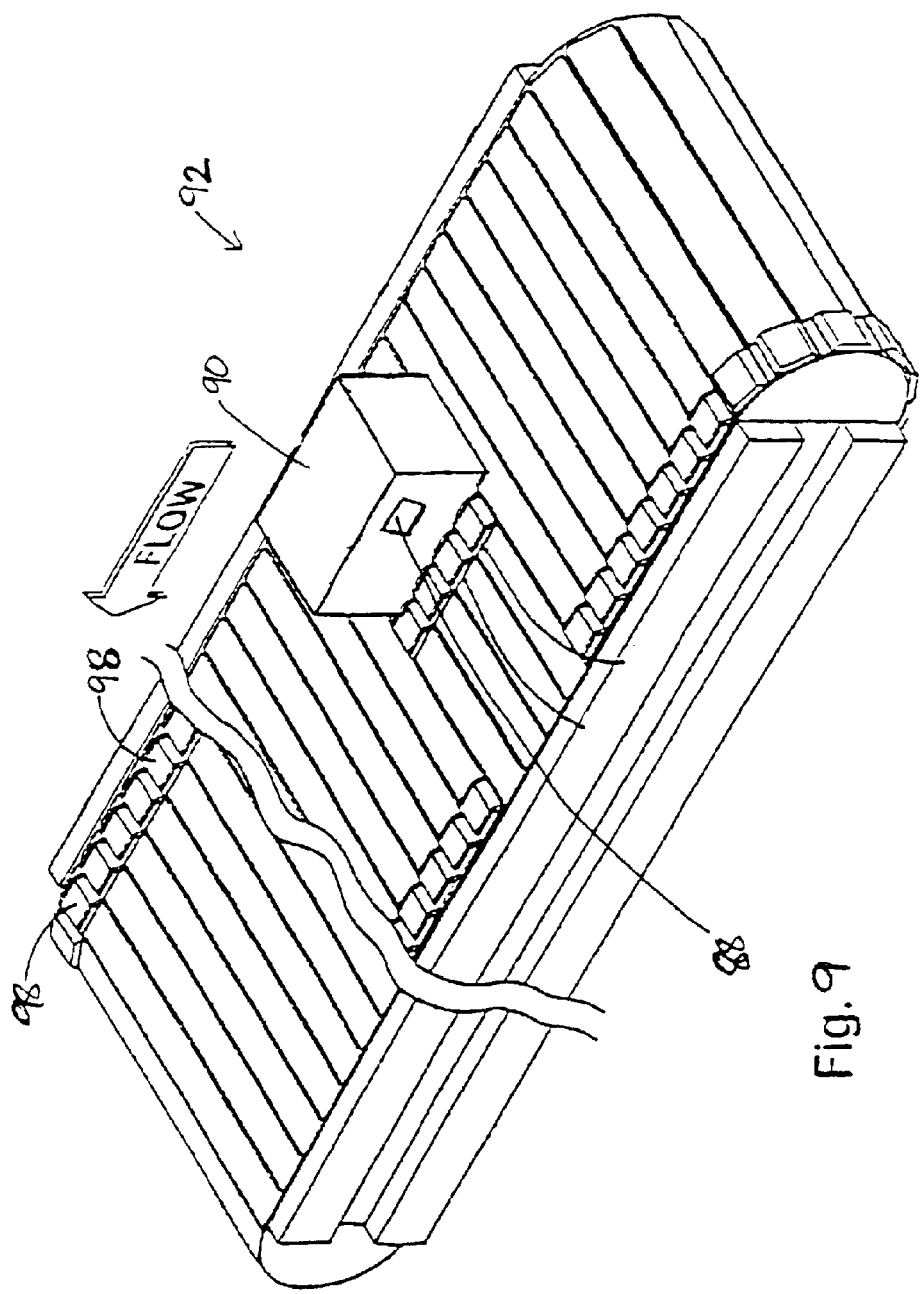
FIG. 9 is a perspective view of a conveyor sortation bed in which the present invention may be embodied.

In addition to the foregoing uses of high frequency radio location signals in conjunction with automatic guided vehicles, high frequency radio location signals may also be used in accordance with the present invention to identify material being moved throughout a warehouse or other facility. In such a situation, each article—or grouping of articles, such as a pallet of stacked articles—has a tag attached to it. An example of such a tag 88 is depicted attached to an article 90 traveling on a conveyor 92 in FIG. 9. The high frequency radio location tag 88 is manufactured in a known manner to reflect high frequency radio location signals it receives according to a predefined patterns. The signals that are received and reflected may be ultra-wideband signals. A tag reader emits a high frequency radio location signal which is reflected by the tag and detected by the tag reader. The tag reader passes this information onto appropriate controls in the material handling environment to ensure that the article is properly routed throughout the facility. The controls may be aware of the correlation between the unique reflective pattern of an individual tag and the information associated with that tag. The high frequency radio location tags may therefore be used to replace bar codes, which require optical alignment for reading, and relatively clean surfaces on which the bar codes are printed. By using high frequency radio location, no particular orientation of the article is necessary for reading the information contained on the high frequency radio location tag. Such high frequency radio location tags find particular suitability with articles traveling on conveyor systems throughout a warehouse. The high frequency radio location tags are preferably constructed so that they do not require any power to operate, either directly or by induction. Their unique signal is merely the result of their unique reflection pattern of the emitted signal or signals. In the example of FIG. 9, the tags 88 may be read by a reader positioned upstream of conveyor 92. The read information may be passed to a divert controller 94 (FIG. 10) which uses the information to determine which of the multiple branch conveyors the article 90 should be diverted to. Divert controller 94 sends commands to activate the appropriate divert shoes 98 which cause the package 90 to be appropriately diverted. The construction and generation of divert shoes 98 may be made in accordance with the system described in commonly assigned, co-pending U.S. patent application Ser. No. 09/968,743 filed Sep. 28, 2001, or the system described in U.S. Pat. No. 5,127,510 issued to Cotter et al., the disclosures of both of which are incorporated herein by reference. Conventional constructions and operations may also be used.

Figure 10:
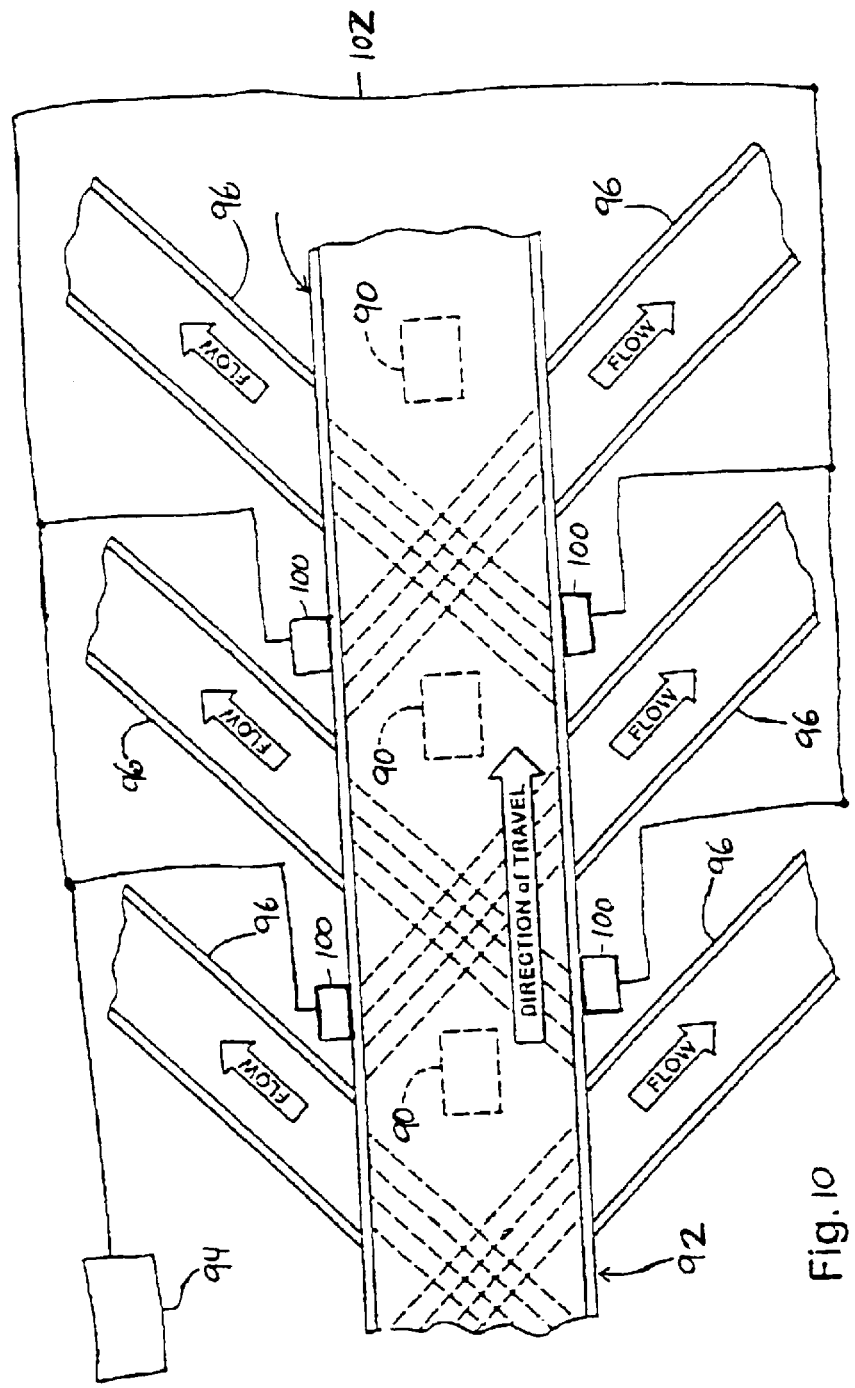
FIG. 10 is plan, schematic view of a conveyor sortation system in which the present invention may be embodied.

UWB transceivers, such as transceivers 46, can also be used in other material handling applications outside AGVs. Such transceivers can be incorporated into components of material handling systems for automatic identification and configuration of components of the material handling system. For example, in sortation systems for conveyors, there may be a number of individual divert control modules 100 associated with each branch conveyor 96 on a given sortation conveyor 92 (FIG. 10). The control modules 100 control, by way of example, the mechanisms for positively displacing articles 90 off of the sortation conveyor onto an adjacent branch conveyor 96. The precise number and location of each of the sortation modules 100 may vary according to the particular installation. During the installation of the sortation system, it is often necessary for a higher level controller of the overall sortation system, such as divert controller 94, to know the position of each of the control modules 100 so that the higher level controller 94 can send divert signals to the correct control module 100 when a particular article 90 is to be diverted to a particular branch conveyor 96. This is discussed in further detail in commonly assigned, U.S. patent application Ser. No. 10/163,788, filed Jun. 6, 2002, and entitled Tiered Control Architecture For Material Handling, the disclosure of which is hereby incorporated herein by reference. In the past, the physical location of such divert control modules 100 was manually input into the higher level controller 94 during installation of the sortation system. By placing transceivers 46 in each divert control module, the distance of each control module down the length of the sortation conveyor can automatically be determined. Such distances are determined in any one of the manners previously described herein, and can be determined in conjunction with a transceiver 46 placed at a reference location, such as the upstream end of the sortation conveyor 92. The transceivers 46 can also be used as wireless communication devices. The higher level controller is also provided with a UWB transceiver that communicates wirelessly with the UWB transceivers 46. The communications can include commands from the higher level controller to the divert modules, status requests, feedback from the modules to the controller, and other sorts of information. The use of such wireless communications eliminates the need for hard wiring connections, such as communications bus 102, between the higher level controller 96 and each divert control module 100.

Figure 11:
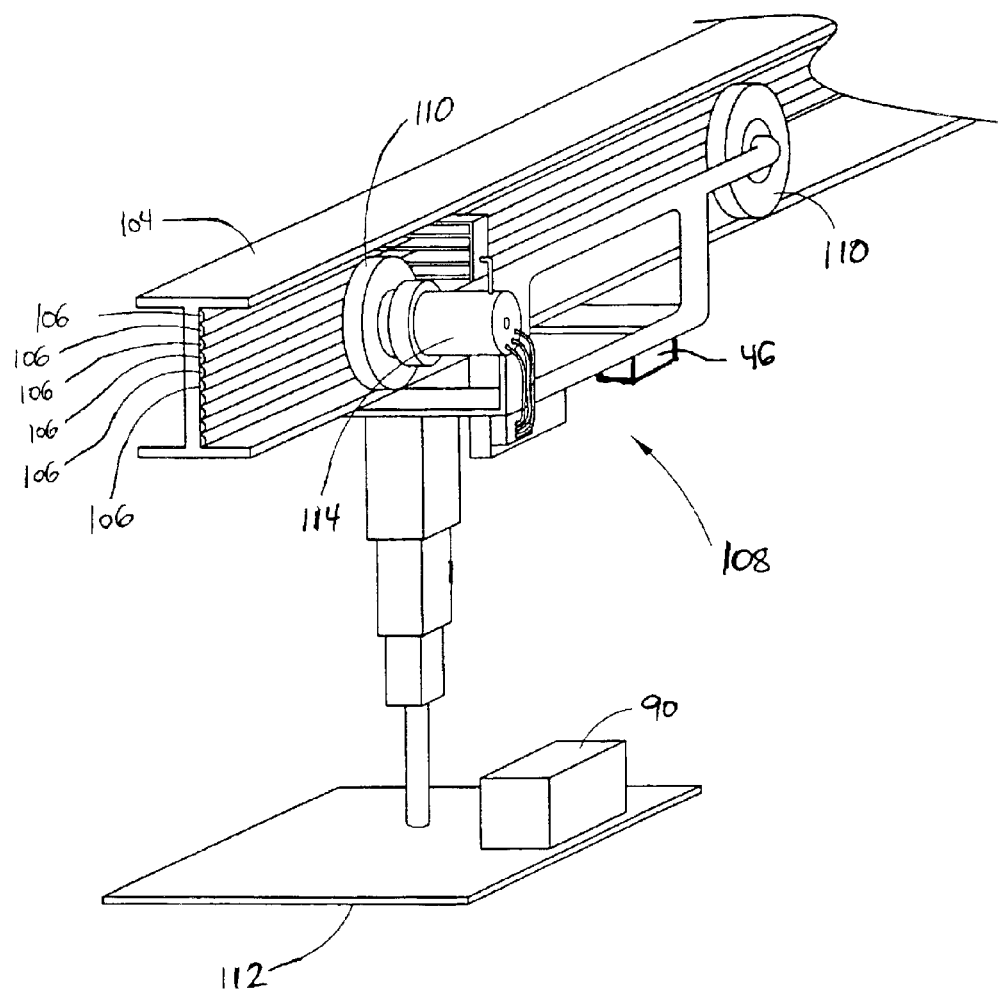
FIG. 11 is a partial perspective view of a monorail system in which the present invention may be embodied.

Beacons 54 and transceivers 46 can also be used with monorail material handling systems, such as overhead electrified monorails. An illustrative example of one such monorail is depicted in FIG. 11. Monorail 104 extends throughout a facility or plant in a pre-defined arrangement. Monorail 104 includes a number of buss bars 106 which supply power and/or communications to a vehicle 108 that is attached to, and hangs downwardly from, rail 104. Vehicle 108 includes a number of wheels 110 that allow it to move along rail 104 and transport articles 90, such as via a platform 112, or by other means. At least one motor 114 is included and powers one of the wheels 110 for movement on rail 104. Vehicles 108 may carry articles 90 undergoing manufacture between workstations. Vehicle 108 may stop at one or more of these workstations to allow time for robots or workers to perform work on the item being manufactured. Vehicle 108 may include a transceiver 46 attached at any suitable location that communicates with beacons 54 placed throughout the facility. The beacons 54 emit signals which transceiver 46 uses to determine its position with respect to the beacons 54. The position may be a one-dimensional, two-dimensional or three-dimensional position determination. Vehicle 108 may use the position determination to determine precisely where it should stop within a given workstation. Vehicle 108 may also use transceiver 46 as a communications device for wirelessly transmitting information between itself and a controller. Such communications may be ultra-wideband communications, or other types of high frequency communications.

While the present invention has been described in terms of the embodiments depicted in the drawings and described herein, it will be understood by one skilled in the art that the present invention is not limited to these particular embodiments, but includes any and all such modifications that are within the spirit and scope of the present invention as defined by the appended claims.

What is claimed is:

1. A system for determining the location of an automatic guided vehicle, comprising:

a plurality of stationary high frequency electromagnetic energy emitting and detecting beacons positioned in an area at known locations, said stationary beacons emitting and detecting high frequency radio electromagnetic energy;

at least one mobile electromagnetic energy beacon positioned on-board the automatic guided vehicle, said mobile beacon capable or communicating with said plurality of stationary beacons using high frequency radio electromagnetic energy;

a controller adapted to determine at least a location of said mobile beacon based upon the communications between said stationary beacons and said mobile beacon; and an incremental sensor adapted to measure changes in the vehicle's position wherein said controller uses the measurements from said incremental sensor in combination with the mobile beacon to determine the vehicle's position.

2. The system of claim 1 wherein said mobile beacon and said stationary beacons emit ultra-wideband signals.

3. The system of claim 2 further including at least a second mobile beacon positioned on said vehicle at a known location, said controller using mobile beacons to determine the vehicle's heading.

4. The system of claim 1 wherein the outputs from said incremental sensor and said mobile beacon are input into a Kalman filter to produce an estimate of the vehicle's position.

5. The system of claim 1 wherein said incremental sensor measures the rotations of at least one wheel on said vehicle.

6. The system of claim 5 further including a gyroscope on-board said vehicle.

7. The system of claim 1 wherein said mobile beacon is adapted to determine its position in three dimensions with respect to said plurality of stationary beacons.

8. The system of claim 1 wherein said controller is further adapted to issue commands to steer the vehicle based upon the location of the mobile beacon as determined by the controller.

9. The system of claim 8 wherein said controller determines the position of the vehicle in three dimensions.

10. The system of claim 1 wherein said controller determines the location of said mobile beacon based upon time of flight measurements of signals emitted from at least one of said stationary beacons to said mobile beacon.

11. The system of claim 10 wherein said controller further determines the heading of the vehicle based upon time of flight measurements of multiple signals emitted from at least one of said stationary beacons to said mobile beacons.

12. The system of claim 1 wherein said controller determines the position of said vehicle based upon time of flight measurements of a signal emitted from said mobile beacon to different ones of said stationary beacons.

13. The system of claim 12 wherein said controller further determines the heading of said vehicle based upon time of flight measurements of multiple signals emitted from said mobile beacon to different ones of said stationary beacons.

14. The system of claim 1 wherein said controller determines the heading of said vehicle based upon time of arrival measurements of a signal emitted from said mobile beacon to different ones of said stationary beacons.

15. The system of claim 14 wherein said controller further determines the position of said vehicle based upon time of arrival measurements of multiple signals emitted from said mobile beacon to different ones of said stationary beacons.

16. The system of claim 1 wherein said controller is positioned on-board said automatic guided vehicle.

17. The system of claim 1 wherein each one of said plurality of stationary beacons emit signals that can be differentiated by said mobile unit from other ones of said stationary beacons.

18. The system of claim 1 further including an off-board display adapted to display the position of said automatic guided vehicle.

19. A system for determining the location of an automatic guided vehicle, comprising:

a plurality of stationary high frequency electromagnetic energy emitting and detecting beacons positioned in an area at known locations, said stationary beacons emitting and detecting high frequency radio electromagnetic energy;

at least one mobile electromagnetic energy beacon positioned on-board the automatic guided vehicle, said mobile beacon capable of communicating with said plurality of stationary beacons using high frequency radio electromagnetic energy; and a controller adapted to determine at least a location of said mobile beacon based upon communications between said stationary beacons and said mobile beacon; and a second mobile beacon positioned on-board the vehicle wherein said controller utilizes the mobile beacons to generate an estimate of the vehicle's heading.

20. A system for determining the location of an automatic guided vehicle, comprising:

a plurality of stationary high frequency electromagnetic energy emitting and detecting beacons positioned in an area at known locations, said stationary beacons emitting and detecting high frequency radio electromagnetic energy;

at least one mobile electromagnetic energy beacon positioned on-board the automatic guided vehicle, said mobile beacon capable of communicating with said plurality of stationary beacons using high frequency radio electromagnetic energy;

a controller adapted to determine at least a location of said mobile beacon based upon the communications between said stationary beacons and said mobile beacon; and a second mobile beacon on-board said vehicle, said mobile beacons being used by said controller to generate an estimate of the vehicle's position which is more precise than if only a single one of the mobile beacons on-board said vehicle were used to generate an estimate of the vehicle's position.

21. A system for determining the location of an automatic guided vehicle, comprising:

a plurality of stationary high frequency electromagnetic energy emitting and detecting beacons positioned in an area at known locations, said stationary beacons emitting and detecting high frequency radio electromagnetic energy;

at least one mobile electromagnetic energy beacon positioned on-board the automatic guided vehicle, said mobile beacon capable of communicating with said plurality of stationary beacons using high frequency radio electromagnetic energy; and a controller adapted to determine at least a location of said mobile beacon based upon the communications between said stationary beacons and said mobile beacon;

wherein said mobile beacon and said plurality of stationary beacons communicate with each other by emitting at least one pulse having a duration of less than one microsecond.

22. The system of claim 21 wherein said mobile beacon and said plurality of stationary beacons communicate with each other by emitting at least one pulse having a duration of less than 100 nanoseconds.

23. A system for determining the location of an automatic guided vehicle, comprising:
 a plurality of stationary high frequency electromagnetic energy emitting and detecting beacons positioned in an area at known locations, said stationary beacons emitting and detecting high frequency radio electromagnetic energy;
 at least one mobile electromagnetic energy beacon positioned on-board the automatic guided vehicle, said mobile beacon capable of communicating with said plurality of stationary beacons using high frequency radio electromagnetic energy; a controller adapted to determine at least a location of said mobile beacon based upon the communications between said stationary beacons and said mobile beacon; and
 a second and third mobile beacon positioned on said vehicle at known, separated locations wherein said controller is adapted to determine the vehicle's heading based upon the differences in time in which each of the mobile beacons detect a signal from one of said stationary beacons.

24. A system for determining the location of an automatic guided vehicle, comprising:
 plurality of stationary high frequency electromagnetic energy emitting and detecting beacons positioned in an area at known locations, said stationary beacons emitting and detecting high frequency radio electromagnetic energy;
 at least one mobile electromagnetic energy beacon positioned on-board the automatic guided vehicle, said mobile beacon capable of communicating with said plurality of stationary beacons using high frequency radio electromagnetic energy; and
 a controller adapted to determine at least a location of said mobile beacon based upon the communications between said stationary beacons and said mobile beacon;
 wherein said vehicle includes multiple mobile beacons positioned on said vehicle at known locations and said controller is adapted to determine the vehicle's heading based upon time of arrival measurements of a signal emitted from at least one of said stationary beacons at said mobile beacons.

25. The system of claim 24 wherein controller is further adapted to determine the vehicle's position based upon time of arrival measurements of multiple signals emitted from at least one of said stationary beacons at said mobile beacons.

26. A kit for modifying a navigation system of an automatic guided vehicle that uses one or more incremental navigation sensors in combination with at least one fixed reference sensor to estimate the vehicle's position, said fixed reference sensor being adapted to detect references positioned at known locations, said kit comprising:
 a plurality of electromagnetic energy emitting beacons for positioning at known locations throughout an environment;
 at least one electromagnetic energy sensor for positioning on a vehicle, said electromagnetic energy sensor adapted to detect signals emitted from said plurality of electromagnetic energy emitting beacons; and
 a controller adapted to use said detected signals in combination with said one or more incremental navigation sensors to generate a position estimate of said vehicle;
 wherein said one or more incremental navigation sensors include at least one wheel encoder adapted to measure the number of rotations of at least one wheel on said vehicle.

27. The kit of claim 26 wherein said one or more incremental navigation sensors further includes at least one gyroscope.

28. The kit of claim 26 wherein said controller uses a Kalman filter to estimate the vehicle's position based upon said detected signals and said one or more incremental navigation sensors.

29. The kit of claim 26 wherein said electromagnetic energy sensor is adapted to detect ultra-wideband transmissions and said plurality of electromagnetic energy emitting beacons are adapted to emit ultra-wideband transmissions.

30. The kit of claim 26 wherein said controller is further adapted to generate an updated position estimate of the vehicle at least five times per second.

31. The kit of claim 26 wherein said beacons and said sensor are adapted to send wireless messages between themselves.

32. A method of installing an AGV system comprising:
 providing a plurality of electromagnetic energy emitting beacons;
 providing at least one automatic guided vehicle that includes at least one sensor for detecting transmissions from said plurality of beacons;
 placing at least three of said beacons at known locations within an environment; measuring the location of the at least three beacons within the environment; placing additional ones of the beacons within the environment;
 using the at least three beacons to measure the location of said additional ones of said beacons within the environment; and
 communicating the location of said plurality of beacons to said automatic guided vehicle via a wireless transmission; and
 programming said at least one automatic guided vehicle to travel along a first pathway.

33. The method of claim 32 further including programming said at least one automatic guided vehicle to travel along a second pathway without having to change the position of any of said beacons, said second pathway being different from said first pathway.

34. The method of claim 32 wherein said environment is a factory, and said method further includes positioning a sufficient number of said beacons throughout the factory in a configuration that enables the automatic guided vehicle to be able to determine its position at substantially any location within the factory.

35. A material handling system comprising:
 a plurality of automatic guided vehicles, each of said plurality of automatic guided vehicle including an ultra-wideband communications system;
 at least one ultra-wideband transmitter positioned on or adjacent to a load of material to be moved by one of said plurality of automatic guided vehicles, said transmitter adapted to transmit a message to said plurality of automatic guided vehicles indicating that the load of material is to be moved to a destination; and a controller adapted to determine which of said plurality of automatic guided vehicles is to retrieve said load in response to said message.

36. The system of claim 35 wherein said controller is further adapted to determine which of said plurality of automatic guided vehicles is to retrieve said load based at least partially upon the physical proximity of each of said vehicles to the load.

37. The system of claim 36 wherein each said automatic guided vehicle includes a queue for storing tasks to be performed by the vehicle, and each of said controllers is further adapted to determine which of said plurality of automatic guided vehicles is to retrieve said load based at least partially upon the number of tasks in each vehicle's queue.

38. The system of claim of 35 further including a plurality of ultra-wideband beacons positioned at known locations throughout an area through which said vehicles move, and a plurality of ultra-wideband sensors positioned on each of said vehicles, said sensors being adapted to determine their position with respect to said beacons.

* * * * *

UNITED STATES PATENT AND TRADEMARK OFFICE
CERTIFICATE OF CORRECTION

PATENT NO. : 6,799,099 B2
APPLICATION NO. : 10/209766
DATED : September 28, 2004
INVENTOR(S) : David W. Zeitler, Garry Koff and Matt Werner Page 1 of 1

It is certified that error appears in the above-identified patent and that said Letters Patent is hereby corrected as shown below:

Column 7:
Line 51, "0.000000005" should be --.000000005--.

Column 19:
Claim 1, Line 1, "or" should be --of--.
Claim 3, Line 17, insert --said-- after "using".

Column 20:
Claim 19, Line 17, insert --the-- after "upon".

Column 21:
Claim 24, Line 28, insert --a-- before "plurality".
Claim 25, Line 50, insert --said-- after "wherein".

Column 22:
Claim 31, Line 22, insert --further-- after "claim 26".

Signed and Sealed this

Fifteenth Day of July, 2008

JON W. DUDAS
*Director of the United States Patent and Trademark Office*